(12) United States Patent
Heilmann et al.

(10) Patent No.: US 12,138,701 B2
(45) Date of Patent: Nov. 12, 2024

(54) HONING METHOD WITH CROSS-GRINDING FOR GEAR WHEELS

(71) Applicant: AUDI AG, Ingolstadt (DE)

(72) Inventors: Markus Heilmann, Garching (DE); Philipp Buratowski, Ingolstadt (DE)

(73) Assignee: AUDI AG, Ingolstadt (DE)

(*) Notice: Subject to any disclaimer, the term of this patent is extended or adjusted under 35 U.S.C. 154(b) by 1684 days.

(21) Appl. No.: 16/322,590

(22) PCT Filed: Jul. 10, 2017

(86) PCT No.: PCT/EP2017/000810
§ 371 (c)(1),
(2) Date: Feb. 1, 2019

(87) PCT Pub. No.: WO2018/024355
PCT Pub. Date: Feb. 8, 2018

(65) Prior Publication Data
US 2019/0168323 A1 Jun. 6, 2019

(30) Foreign Application Priority Data
Aug. 3, 2016 (DE) .................. 10 2016 009 468.0

(51) Int. Cl.
*B23F 19/05* (2006.01)
*B23F 5/16* (2006.01)
*B23F 21/03* (2006.01)

(52) U.S. Cl.
CPC ............ *B23F 19/057* (2013.01); *B23F 5/163* (2013.01); *B23F 19/05* (2013.01); *B23F 21/03* (2013.01)

(58) Field of Classification Search
CPC .. B23F 5/163; B23F 5/06; B23F 5/065; B23F 19/05; B23F 19/057; B23F 21/03;
(Continued)

(56) References Cited

U.S. PATENT DOCUMENTS 3,720,989 A * 3/1973 Ramond ................. B23F 21/10
29/893.3
3,897,661 A * 8/1975 Inatomi ..................... B23F 5/04
451/148
(Continued)

FOREIGN PATENT DOCUMENTS

CN  2186629 Y  1/1995
CN  1102367 A  5/1995
(Continued)

OTHER PUBLICATIONS

Machine translation of DE-4231021-A1 (Year: 1994).*
(Continued)

*Primary Examiner* — Robert F Neibaur
(74) *Attorney, Agent, or Firm* — Maier & Maier, PLLC

(57) ABSTRACT

A method for creating a surface structure on a gear wheel in a honing process, in which at least one honing tool is moved along the gear wheel in a first direction using a first crossed axes angle, and in which, subsequently, the at least one honing tool is moved along the gear wheel in a second direction, opposite to the first direction, using a second crossed axes angle, and in which the first crossed axes angle and the second crossed axes angle are chosen such that first scoring marks produced when the at least one honing tool is moved in the first direction on a surface of the gear wheel at least partially intersect, at a given angle, respective second scoring marks produced when the at least one honing tool is moved in the second direction on the surface of the gear wheel.

9 Claims, 2 Drawing Sheets

(58) Field of Classification Search
CPC ...... B23F 21/02; B23F 21/023; B23F 21/006; B23F 3/34; B23F 3/346; B23F 33/08; B23F 33/082; B23F 33/083; B23F 33/06
USPC .......... 451/47, 147, 161, 219, 275, 253, 900
See application file for complete search history.

(56) References Cited

U.S. PATENT DOCUMENTS

| | | | | |
|---|---|---|---|---|
| 5,255,475 | A * | 10/1993 | Kotthaus | B23F 21/03 451/548 |
| 5,443,338 | A * | 8/1995 | Huber | B23Q 1/4828 451/900 |
| 9,108,258 | B2 * | 8/2015 | Stadtfeld | B23F 21/16 |
| 2006/0264155 | A1 | 11/2006 | Kobialka | |
| 2013/0336739 | A1 * | 12/2013 | Kreschel | B23F 17/00 409/10 |
| 2018/0200814 | A1 | 7/2018 | Schieke | |

FOREIGN PATENT DOCUMENTS

| | | | |
|---|---|---|---|
| CN | 1608777 A | 4/2005 | |
| CN | 1868651 A | 11/2006 | |
| DE | 1296486 B | 5/1969 | |
| DE | 2303640 A1 | 9/1973 | |
| DE | 9300936 U1 | 5/1993 | |
| DE | 4231021 A1 * | 3/1994 | ............ B23F 19/007 |
| DE | 4329822 A1 | 3/1994 | |
| DE | 102005005993 A1 | 8/2006 | |
| DE | 102015111663 A1 | 1/2017 | |
| GB | 480720 A | 2/1938 | |
| JP | S41-14040 B | 8/1966 | |
| JP | 2004-136426 A | 5/2004 | |
| JP | 2010-158749 A | 7/2010 | |

OTHER PUBLICATIONS

International Search Report and Written Opinion issued on Sep. 15, 2017 in corresponding International Application No. PCT/EP2017/000810; 20 pages.
Ruetti, R., "Leistungshonen Ist Jetzt Wirtschaftlich Wie Noch Nie", Werkstatt + Betrieb, Carl Hanser Verlag, München DE, vol. 137, No. 5, May 1, 2004; 4 pages; Partial English translation attached.
Office Action issued on Dec. 20, 2019, in corresponding Chinese Application No. 201780047408.6 including partial machine-generated English language translation; 11 pages.
German Examination Report issued on Jul. 10, 2019, in corresponding German patent application No. 10 2016 009 468.0 including partial machine-generated English language translation; 10 pages.
International Preliminary Report on Patentability (Chapter I) issued Feb. 14, 2019 of corresponding International application No. PCT/EP2017/000810; 7 pgs.
Office Action issued on Mar. 31, 2020 in corresponding Japanese Application No. 2019-506168; 11 pages with English-language translation.

* cited by examiner

HONING METHOD WITH CROSS-GRINDING FOR GEAR WHEELS

FIELD

The present invention relates to a method for creating a surface structure on a gear wheel in a gear honing process, as well as a gear wheel and a honing machine.

BACKGROUND

Gear wheels are subject to enormous loads on account of very large pressure and friction forces during operation in a transmission, for example. In order to reduce the loads of respective gear wheels and to minimize noise emission from the gear wheels due to a uniform excitation, which lead to tooth vibrations, gear wheels are often encased in a film of lubricant, such as oil, during operation.

During the fabrication of a gear wheel, its teeth are often hard fine machined by means of gear honing methods or gear grinding methods. In this process, surface structures are created on the teeth of the gear wheel that are not optimally suited to retain on the gear wheel a film of lubricant that is applied to the gear wheel and to assure a protection of the gear wheel against friction energy or a noise damping. Accordingly, the gear wheels wear down needlessly fast on account of a non-optimal film of lubricant and cause a needlessly high noise emission.

In the German publication DE 42 31 021 A1, a method and a device are disclosed for the machining of helical evolvent tooth flanks, in which a cross-grinding structure is created on a workpiece by a pendulum movement of a variable profile displacement. A globoid-shaped tool is used in this case.

SUMMARY

Against this background, a method is proposed for creating a surface structure on a gear wheel in a honing process, in which at least one honing tool is moved along the gear wheel in a first direction using a first axis intersection or crossed axes angle, and in which, subsequently, the at least one honing tool is moved along the gear wheel in a second direction, opposite to the first direction, using a second axis crossed axes angle, and in which the first crossed axes angle and the second crossed axes angle are chosen such that first scoring marks produced when the at least one honing tool is moved in the first direction on a surface of the gear wheel at least partially intersect, at a given angle, respective second scoring marks produced when the at least one honing tool is moved in the second direction on the surface of the gear wheel.

The proposed method serves in particular for creating a cross-grinding, i.e., a scoring mark structure on a surface of a gear wheel, in which various scoring marks run crossed and accordingly intersect each other at a predetermined angle. It may be provided in this case that only a portion of the respective first scoring marks intersect respective second scoring marks. Preferably, however, it is provided that all first scoring marks intersect at least one second scoring mark.

In order to create a cross-grinding on a surface of a gear wheel, such as, for example, a gear wheel, it is proposed according to the invention that a honing tool, such as a honing ring or a honing wheel, is moved in a first direction along the gear wheel, using a first crossed axes angle, and, subsequently, the honing tool is moved along the gear wheel in a second direction, opposite the first direction, using a second crossed axes angle. Accordingly, it is proposed that, in the honing process provided according to the invention, a change in direction is performed for the movement of the honing tool along the gear wheel.

Furthermore, it is provided, in particular, according to the proposed method that the first crossed axes angle and the second crossed axes angle are different. This means that the crossed axes angle changes upon a change in the direction of movement of the honing tool. Thus, e.g., when the honing tool is moving in the first direction, a scoring mark structure is generated from bottom left to top right, and when the honing tool is moving in the second direction, a scoring mark structure is generated from bottom right to top left, so that scoring mark structures generated during the movements in the first and the second direction intersect and produce a cross-grinding, by which compartments are formed on the surface of a respective gear wheel, especially on a flank of a tooth of a respective gear wheel, which can especially effectively hold a film of lubricant, such as oil, for example, on the gear wheel, even when the gear wheel is subjected to a high load, such as is expected when used in a transmission.

It is especially provided that the above presented method is used to generate a cross-grinding structure on respective tooth flanks of teeth of a gear wheel. For this purpose, according to one possible embodiment of the proposed method, the gear wheel may be clamped in a honing machine, and a honing ring of the honing machine can be moved around the gear wheel, wherein the honing ring at first is moved in a first direction of rotation, and subsequently, in a second direction of rotation along the gear wheel. In order to change a crossed axes angle of the gear wheel or the honing ring, it is provided that upon a change in the direction of movement of the honing ring, the gear wheel is once again aligned, i.e., in a new orientation with respect to the honing ring.

By a crossed axes angle is meant, in the context of the present invention, in particular, an angle that runs between an axis through a center point of the honing tool and standing orthogonally to a transverse axis of the tool, such as an axis of rotation of the honing tool, and an axis through a center point of a gear wheel and standing orthogonally to a transverse axis of the gear wheel, such as an axis of rotation of the gear wheel.

By a scoring mark, in the context of the present invention, is meant a fine unevenness on the surface of a gear wheel, such as occurs, for example, when grinding a cross-grinding or cross-hatching on a cylinder.

In order to move the honing tool provided by the invention along a respective gear wheel, the gear wheel and/or the honing tool can be moved, i.e., placed in rotation, in particular.

Thanks to the change in direction of movement according to the invention for generating a surface structure, it is possible to generate by means of an efficient kinematics, i.e., a rapidly occurring sequence of movements, a surface structure on a gear wheel that is suitable for holding a film of lubricant on the gear wheel even under heavy loads, such as, for example, when used in a transmission. Accordingly, the proposed method results in an optimal oil wetting of the respective teeth or tooth flanks of a gear wheel and, consequently, an increased efficiency of a corresponding device, such as a transmission, when compared to the prior art.

In one possible embodiment of the proposed method, it is provided that a gear honing process is chosen as the honing process.

A gear honing process, during which teeth of a gear wheel are honed, differs from a cylinder honing process, for example, in that generally a radial tool is employed, such as, for example, a honing ring or a honing wheel, which moves radially along the gear wheel and engages in gaps between the teeth of the gear wheel in order to machine the teeth.

In another possible embodiment of the proposed method, it is provided that a power honing layout is used to move the honing tool along the gear wheel.

By means of a power honing arrangement, such as a machine of type 150SPH from the Gleason company, a gear wheel can be subjected to a power honing process. By adapting the kinematics of the power honing arrangement, a machining of the gear wheel can be accomplished according to the proposed method. For this purpose, the power honing arrangement may be configured to move a honing ring along the gear wheel and/or to move the gear wheel along the honing ring, adjusting a respective crossed axes angle between the honing ring and the gear wheel, depending on the direction of movement of the gear wheel or the honing ring.

In another possible embodiment of the proposed method, it is provided that the scoring marks are created on an internal toothing or an external toothing of the gear wheel.

The proposed method makes it possible to apply a surface structure in order to optimize the oil wetting behavior of a gear wheel, both for internally toothed and externally toothed gear wheels. In particular, it is provided that respective tooth flanks of a gear wheel are treated in order to create a surface structure optimized for oil wetting, for example, by a cross-grinding. It is proposed that the cross-grinding produces compartments in which a lubricant such as oil, for example, is prevented from sliding off the gear wheel.

Moreover, the present invention relates to a gear wheel, wherein respective teeth of the gear wheel have a surface structure with a number of first scoring marks and a number of second scoring marks, and wherein the number of first scoring marks intersects the number of second scoring marks, at least partly, at a given angle.

The proposed method serves, in particular, for producing the proposed gear wheel.

In one embodiment of the proposed gear wheel it is especially provided that the number of first scoring marks and the number of second scoring marks are arranged in a cross-grinding or cross-hatching pattern.

Moreover, the present invention relates to a honing machine for the power honing of a gear wheel, having at least one honing tool and a controller, wherein the controller is configured to move the at least one honing tool in a first direction along the gear wheel, and wherein the controller is furthermore configured to move the at least one honing tool in a second direction, opposite the first direction, along the gear wheel, and wherein the controller is furthermore configured to adjust a crossed axes angle between the gear wheel and the at least one honing tool in dependence on a current direction of movement, such that, when the at least one honing tool is moved in the first direction, scoring marks created on a surface of the gear wheel at least partly intersect, at a given angle, respective scoring marks produced on the surface of the gear wheel during a movement of the at least one honing tool in the second direction.

The proposed honing machine serves, in particular, to carry out the proposed method.

Further benefits and embodiments will emerge from the description and the appended drawings.

Of course, the abovementioned features and those yet to be explained below can be used not only in the particular indicated combination, but also in other combinations or standing alone, without leaving the scope of the present invention.

BRIEF DESCRIPTION OF THE DRAWINGS

The invention is shown schematically with the aid of embodiments in the drawings and shall be described schematically and in detail with reference to the drawings.

DETAILED DESCRIPTION

Figure 1:
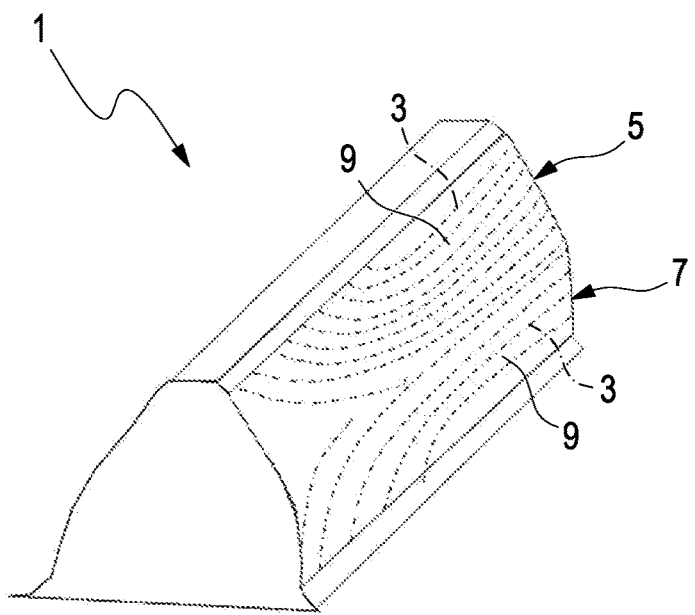
FIG. 1 shows a tooth of a gear wheel with a surface structure that is created by a honing process according to the prior art.

In FIG. 1, a tooth 1 of a gear wheel is shown, which has been machined by means of a honing ring in a method according to the prior art. The honing ring has been moved along the tooth 1 while maintaining a crossed axes angle between the honing ring and the tooth 1. Accordingly, a surface structure has been formed on the tooth 1 having scoring marks 3 on a top side 5 and a bottom side 7 of the tooth 1 that run substantially parallel to each other. The scoring marks 3 on the top side 5 come close to the scoring marks 3 on the bottom side 7, without intersecting them. This means that channels 9 are formed by the scoring marks 3, through which, under the action of a compressive force, such as that occurring when used in a transmission, a lubricant such as oil can slide off from the tooth 1, and accordingly the tooth is poorly protected against pressure and temperature stresses.

Figure 2:
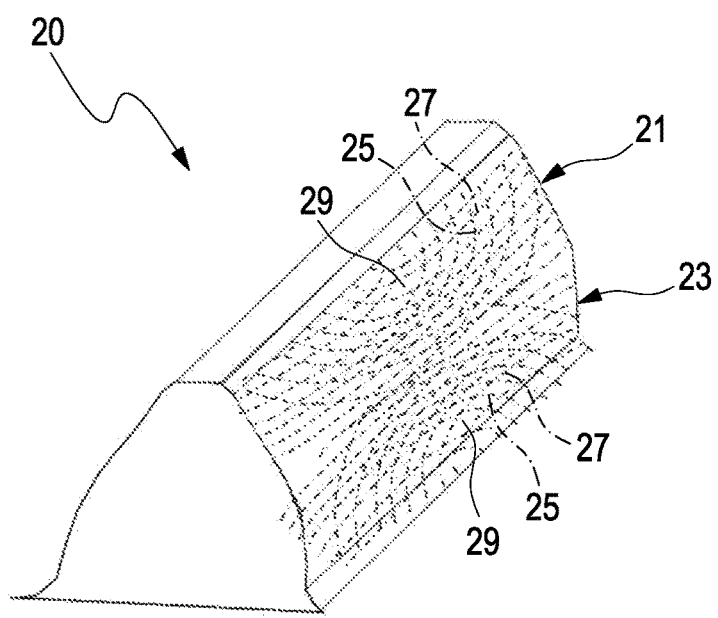
FIG. 2 shows a tooth of a gear wheel with a surface structure that is created by a honing process according to one possible embodiment of the proposed method.

In FIG. 2, a tooth 20 of a gear wheel is shown that has been machined by means of a honing ring according to one possible embodiment of the proposed method. The honing ring here was moved along the tooth 20 in two directions and using two different crossed axes angles. Accordingly, a surface structure was formed on the tooth 20 having scoring marks 25 and 27, respectively, on both a top side 21 and a bottom side 23 of the tooth 20. The scoring marks 25 have been generated during a forward movement of the honing ring and using a first crossed axes angle of 20° for example. The scoring marks 27, on the other hand, have been generated during a backward movement of the honing ring, i.e., a movement of the honing ring opposite the forward movement, and using a crossed axes angle of −20°, for example.

The gear wheel was moved each time in the opposite direction during the forward movement and the backward movement of the honing ring.

It is evident that the scoring marks 25 and the scoring marks 27 intersect each other, so that compartments 29 are produced, each of them being enclosed by scoring marks 25 and scoring marks 27. This means that a lubricant such as oil that has been introduced in the compartments 29 cannot easily be removed from a respective compartment 29, since the scoring marks 25 and the scoring marks 27 produce a barrier effect and hold the lubricant in the compartments 29. Accordingly, the tooth 20 of the gear wheel is protected by the lubricant even under a heavy load, such as may be expected in a transmission, for example. This means that the gear wheel can be operated with especially little wear.

Figure 3:
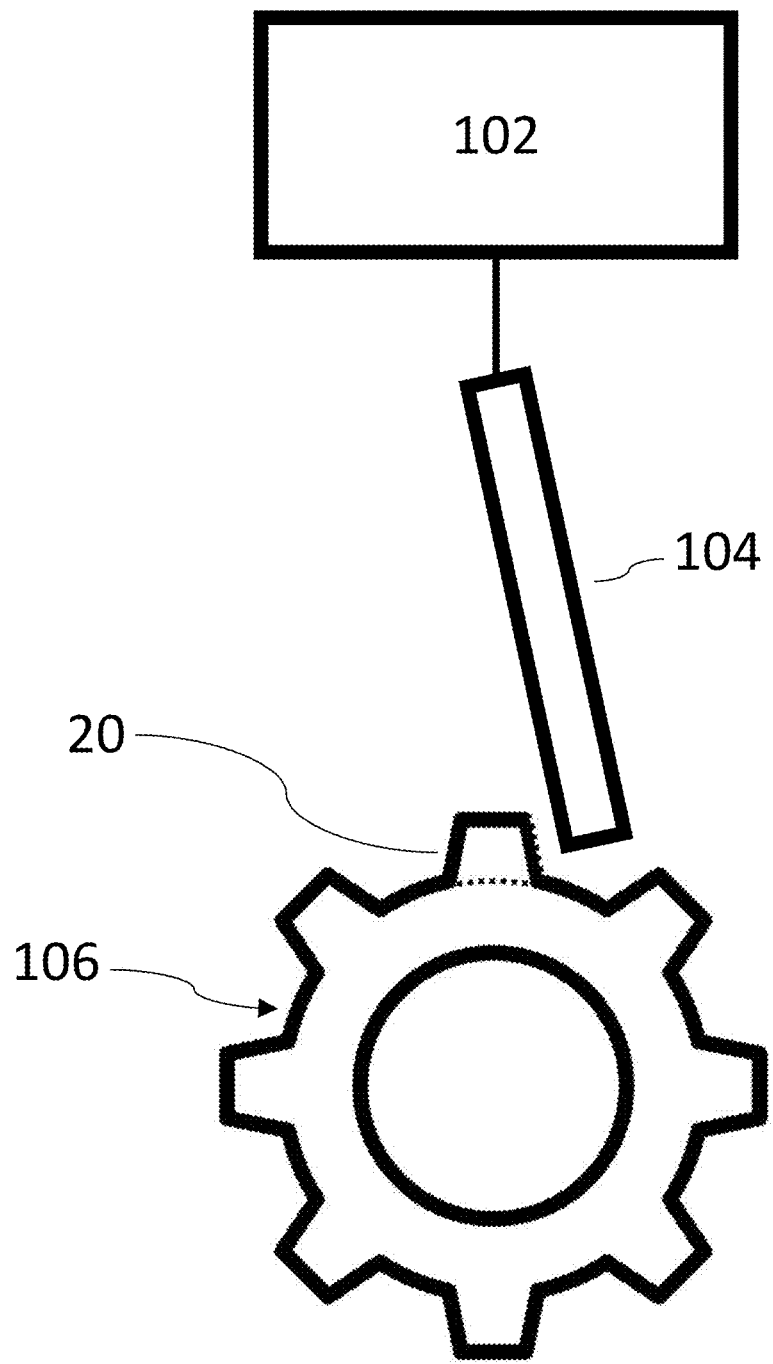
FIG. 3 shows a gear wheel with a tooth having a surface structure that is created by a honing process according to one possible embodiment of the proposed method.

In FIG. 3, a gear wheel 106 having a tooth 20 machined by means of a honing tool 104 having a honing ring is shown. Said honing tool 104 may be controlled via a controller 102.

The invention claimed is:

1. A method for creating a surface structure on a gear wheel in a honing process, comprising:
    at least one honing tool is moved along the gear wheel in a first direction using a first crossed axes angle, wherein the at least one honing tool is moved along the gear wheel in a second direction, opposite to the first direction, using a second crossed axes angle, wherein the first crossed axes angle and the second crossed axes angle are chosen such that first scoring marks produced when the at least one honing tool is moved in the first direction on a surface of the gear wheel at least partially intersect, at a given angle, respective second scoring marks produced when the at least one honing tool is moved in the second direction on the surface of the gear wheel;
    wherein each of the first scoring marks provided at the first crossed axes angle and the second scoring marks provided at the second crossed axes angle intersects an axis extending transversely from a center point of the gear wheel, said axis separating a left half of the gear wheel from a right half of the gear wheel;
    wherein each of the first scoring marks extends from a side-left edge of the gear wheel on the left half to a top of the gear wheel on the right half; and
    wherein each of the second scoring marks extends from a right edge of the gear wheel on the right half to the top of the gear wheel on the left half.

2. The method as claimed in claim 1, wherein a gear honing process is chosen as the honing process.

3. The method as claimed in claim 1, wherein a power honing arrangement is used to move the honing tool along the gear wheel.

4. The method as claimed in claim 1, wherein the at least one honing tool is designed as a honing ring and is moved radially along the gear wheel.

5. The method as claimed in claim 1, wherein a cross-grinding is generated on the gear wheel.

6. The method as claimed in claim 1, wherein the scoring marks are created on an internal toothing or an external toothing of the gear wheel.

7. A gear wheel, comprising:
    respective teeth of the gear wheel have a surface structure with a number of first scoring marks and a number of second scoring marks, and wherein the number of first scoring marks intersects the number of second scoring marks, at least partly, at a given angle;
    wherein each of the first scoring marks provided at a first crossed axes angle and the second scoring marks provided at a second crossed axes angle intersects an axis extending transversely from a center point of the gear wheel, said axis separating a left half of the gear wheel from a right half of the gear wheel;
    wherein each of the first scoring marks extends from a left edge of the gear wheel on the left half to a top of the gear wheel on the right half; and
    wherein each of the second scoring marks extends from a right edge of the gear wheel on the right half to the top of the gear wheel on the left half.

8. The gear wheel as claimed in claim 7, wherein the number of first scoring marks and the number of second scoring marks are arranged in a cross-grinding or cross-hatching pattern.

9. A honing machine for the power honing of a gear wheel, comprising:
    at least one honing tool and a controller, wherein the controller moves the at least one honing tool in a first direction along the gear wheel, and wherein the controller moves the at least one honing tool in a second direction, opposite to the first direction, along the gear wheel, and wherein the controller adjusts a crossed axes angle between the gear wheel and the at least one honing tool in dependence on a current direction of movement, such that, when the at least one honing tool is moved in the first direction, scoring marks created on a surface of the gear wheel at least partly intersect, at a given angle, respective scoring marks produced on the surface of the gear wheel during a movement of the at least one honing tool in the second direction;
    wherein each of the first scoring marks provided at the first crossed axes angle and the second scoring marks provided at the second crossed axes angle intersects an axis extending transversely from a center point of the gear wheel, said axis separating a left half of the gear wheel from a right half of the gear wheel;
    wherein each of the first scoring marks extends from a left edge of the gear wheel on the left half to a top of the gear wheel on the right half; and
    wherein each of the second scoring marks extends from a right edge of the gear wheel on the right half to the top of the gear wheel on the left half.

* * * * *